US012755123B2

(12) United States Patent
Bohn

(10) Patent No.: US 12,755,123 B2

(45) Date of Patent: Oct. 6, 2026

(54) MICROWAVE-SAFE INLAY

(71) Applicant: etifix GmbH, Grafenberg (DE)

(72) Inventor: Martin Bohn, Reutlingen (DE)

(73) Assignee: etifix GmbH, Grafenberg (DE)

( * ) Notice: Subject to any disclaimer, the term of this patent is extended or adjusted under 35 U.S.C. 154(b) by 0 days.

(21) Appl. No.: 19/395,228

(22) Filed: Nov. 20, 2025

(65) Prior Publication Data

US 2026/0148031 A1 May 28, 2026

(30) Foreign Application Priority Data

Nov. 26, 2024 (EP) .................................... 24215399

(51) Int. Cl.
*G06K 19/077* (2006.01)
*G06K 19/07* (2006.01)

(52) U.S. Cl.
CPC ................................ *G06K 19/0723* (2013.01)

(58) Field of Classification Search
CPC ................................................. G06K 19/0723
See application file for complete search history.

(56) References Cited

U.S. PATENT DOCUMENTS

| | | | | |
|---|---|---|---|---|
| 6,607,764 B1 * | 8/2003 | Keller | ................ | B65D 81/3453 426/118 |
| 10,311,355 B1 | 6/2019 | Hahn et al. | | |
| 2020/0006840 A1 | 1/2020 | Forster | | |

FOREIGN PATENT DOCUMENTS

| | | |
|---|---|---|
| EP | 4 120 133 B1 | 4/2024 |

* cited by examiner

*Primary Examiner* — Jamara A Franklin

(74) *Attorney, Agent, or Firm* — Collard & Roe, P.C.

(57) ABSTRACT

A microwave-safe inlay includes an RFID chip, an antenna, and a substrate having special shielding surfaces. These shielding surfaces are arranged in such a manner that the shielding surfaces block microwave radiation, while communication in the HF/NFC and UHF range continues to be possible. The inlay is thin, mechanically and thermally durable, and is used with or without shielding elements to be additionally placed under the inlay. The inlay is intended for use with and integration into reusable microwavable dishes, so as to allow reliable identification and writing or reading of additional information.

20 Claims, 3 Drawing Sheets

MICROWAVE-SAFE INLAY

CROSS REFERENCE TO RELATED APPLICATIONS

Applicant claims priority under 35 U.S.C. § 119 of European Application No. 24215399.7 filed on Nov. 26, 2024, the disclosure of which is incorporated by reference.

BACKGROUND OF THE INVENTION

1. Field of the Invention

The present invention relates to a microwave-safe inlay comprising a radio frequency identification (RFID) chip, an antenna connected to this chip electrically or magnetically, and a first substrate, arranged to have parallel surfaces, having a plurality of discrete shielding surfaces, wherein the RFID chip, together with the antenna, is applied to the first substrate, and two adjacent shielding surfaces have an interstice between them, in each instance.

2. Description of the Related Art

Such an inlay is already previously known from EP 4 120 133 B1. This inlay is intended for use on reusable microwavable dishes. Such packaging allows the purchase of ready-to-eat, freshly prepared foods that are sold together with the dishes. These microwavable dishes are usually sold using a deposit system. The known inlay serves, in a Smart Label, for identification of the dishes as belonging to the business and to the related deposit system, and can also be used, if necessary, for categorization of the dishes.

It is provided, in this regard, that the microwavable dishes are supposed to be assigned to a specific restaurant, so as to prevent outside dishes from accumulating at a different vendor. Furthermore, only dishes that are actually intended for return are supposed to be accepted back. This is already accomplished, in the state of the art, in many cases, using RFID chips (Radio Frequency Identification chips), which are arranged in Smart Labels, together with an antenna, on a substrate, and thereby are brought together to produce an inlay. By means of a corresponding read/write device, the RFID chip can be written to or read in a conventional manner.

An RFID chip does not have its own power source, but rather receives energy, with its antenna, for being read by the communication partner, which partner makes this energy available by way of an electromagnetic field, using a read/write device. This energy is sufficient to write to or read the memory of the RFID chip and to transmit a reply signal by way of the antenna.

EP 4 120 133 B1 deals with the problem that during heating in a microwave oven, for example when ready-to-eat foods are to be heated up once again, the problem occurs that the microwave radiation is also coupled into the antenna. This radiation can transmit sufficient energy to damage or destroy the inlay. For this problem, EP 4 120 133 B1 proposes keeping an additional shielding element available and laying it under the inlay, so that the inlay is enclosed between shielding surfaces connected to the inlay and the shielding element that lies underneath, as long as it is accommodated in the microwave oven. However, this represents a disadvantage in that if the shielding element that lies underneath is not used, the inlay can be damaged.

In order to eliminate this error source, a further development proposes gluing the inlay onto film sections that overlap one another and have a recess in the center of the ring-shaped antenna. As a result, the RFID chip and the antenna are shielded sufficiently, so that it is possible to do without the shielding element that is placed underneath, while communication continues to be possible due to the overlap. While the microwave radiation cannot pass through the interstice of the overlapping layers and is conducted away by them, the waves of the inlay, if it is a HF inlay (high-frequency inlay) or NFC inlay (Near Field Communication inlay), can nevertheless leave the region of the inlay and be read by a reading device.

It has been shown that although HF/NFC communication in the range of 13.56 MHz is possible in this manner, RFID inlays in the UHF range (Ultra-High-Frequency range), in the range of 860-960 MHz, cannot be operated with this solution.

SUMMARY OF THE INVENTION

Against this background, the present invention is based on the task of creating a microwave-safe inlay that is not only reliably shielded from microwaves, but is also reliably shielded from microwaves on both sides, with and without a separately underlying shielding element, and also allows communication, both in the HF/NFC range and in the UHF range, even through the shielding.

This task is accomplished by means of a microwave-safe inlay in accordance with the invention. Practical embodiments of such an inlay are discussed below.

What is provided, in this regard, is a microwave-safe inlay comprising an RFID chip, an antenna connected with the chip electrically or magnetically, and a first substrate, arranged surface-parallel, having a plurality of discrete shielding surfaces, wherein the RFID chip, with the antenna, is applied to the first substrate, and two adjacent shielding surfaces have an interstice between them, in each instance. According to the invention, such a microwave-safe inlay is characterized in that the shielding surfaces are arranged as separate elements, spaced apart from one another, on the first substrate, in a pattern in which the interstices between the adjacent shielding surfaces are oriented, relative to one another, so as not to align with one another, in such a manner that they block every straight-line path through the shielding surfaces that runs exclusively along the interstices.

From this, it results that the interstices are conceived in such a manner that no microwave radiation is allowed to pass through the shielding surfaces of the first substrate, whereas the inlay can continue to transmit and receive. It represents an extreme case if microwave beams can occur in the interstices and can be coupled into the antenna in this region. However, this is countered in that straight paths through these interstices are blocked by means of the shaping and placement of the shielding surfaces. The inlay is therefore protected by means of this special form of shielding, but can transmit and receive in its entire spectrum, for its part, whether in the HF/NFC or in the UHF range. The inlay is protected in such an arrangement, and is not damaged or destroyed in the microwave oven. It has been shown that such an arrangement can be operated without an underlying shielding element, in particular if it is attached to a full container. In the case of an empty container, however, it nevertheless appears practical to place an additional, planar shielding element underneath.

Preferably, the RFID chip, together with the antenna, can be applied directly to the first substrate on its side that faces away from the shielding surfaces. Such an arrangement prevents short-circuits between the RFID chip and the shielding surfaces, and nevertheless guarantees that the RFID chip can transmit and receive data. Because of the fact that the RFID chip, with its antenna, is arranged directly on the one side of the first substrate, and the shielding surface is arranged on the opposite side of the same substrate layer, an extremely thin inlay is created, which can be used as a single layer, as such. An inlay that is applied so extremely thinly offers only a very small attack surface against release, in particular peeling off from the surface to which adhesive is applied, so that the mechanical and thermal durability is thereby clearly improved, such as, for example, in a washing process in a dishwasher. To the extent that it is possible to do without a cover layer, all that is additionally needed is an adhesive layer as an adhesion-imparting agent with the surface.

In an alternative embodiment, the RFID chip can be connected to an antenna that is applied on both sides of a second substrate, and this substrate is applied to the first substrate on its side that lies opposite the shielding surfaces, preferably glued on. This makes it possible to produce the shielding surface and the RFID chip having an antenna separately from one another, and to join them together in an additional work step. In the end result, for example, the RFID chip or the shielding surface can thereby be enclosed between the first and the second substrate, and thereby additionally protected, or a dual-layer substrate layer can be formed between these sides. Direct application of the antenna to the shielding elements should be avoided, so as not to produce any short-circuits.

The antenna can be applied to the second substrate, in particular in the case of HF/NFC antennas, on both sides, and the shielding surfaces can be applied to the first substrate on its side that faces away from the RFID chip and the antenna. In this way, using the second substrate, it is possible to join together even dual-layer antennas, using the method according to the invention, to produce an inlay that is still very thin, composed of merely two substrate layers.

In a further alternative embodiment, it can be provided that the RFID chip, together with the antenna, is applied to a second substrate, and the latter is applied to the first substrate, preferably glued on, wherein the shielding surfaces are assigned either to the first substrate, on both sides, or to the first substrate on one side, and to a third substrate applied to the first substrate, on the side opposite the second substrate, on one side, as pattern layers. In this way, not only is the radiation that runs more or less parallel to the inlay shielded, but rather denser shielding perpendicular to the inlay also occurs.

This can be developed further, to some advantage, in that the shielding surfaces are arranged in the pattern layers, in such a manner that the pattern layers are offset from one another in at least one surface direction. While the interstices, because of the adhesive layers that lie in between, are sufficient for the communication of the RFID chip by way of the antenna, it is all the less possible for the microwave radiation to come all the way up to the antenna and destroy the RFID chip. A further improved solution results from this, which is less susceptible to damage caused by microwave radiation.

In particular, this can be the case if the shielding surfaces of the pattern layers overlap one another without gaps. To the extent that penetration of the microwave radiation through the inlay is more or less not possible even in the perpendicular direction, while nevertheless the communication of the RFID chip penetrates, such an inlay can be operated even without additional shielding elements, in particular if these are being operated on microwavable dishes, for example, and these dishes are filled with foods, in other words the microwaves are converted to heat radiation in the goods to be heated.

In a concrete embodiment, the shielding surfaces can be structured to be circular, oval or as a regular polygon, in particular as a hexagon, so that each of these shielding surfaces is surrounded by six adjacent shielding surfaces. Alternatively, the shielding surfaces can also consist of freely shaped contours. A circular embodiment of the shielding surfaces is advantageous in that in this manner, spark-over from corner to corner can be avoided, something that could destroy the inlay, in the end result. Likewise, however, fundamentally also oval, regularly polygonal or also freely shaped shielding surfaces can be applied to the substrate. Specifically in the case of hexagonal shielding surfaces, it can be provided that they form a honeycomb pattern. Also in a honeycomb pattern, the shielding surfaces are arranged in such a manner that the recesses do not run in one piece, in a straight line, through a metal shield formed by the shielding surfaces, but rather each straight path through the metal shield is blocked by a shielding surface. Consequently, the RFID chip can also be reliably protected against microwave radiation in such a modification.

The shielding surfaces along a row can take up a distance from center point to center point that is greater than the diameter of the individual shielding surfaces, while the distance of one row from an adjacent row is smaller than the diameter of the individual shielding surfaces. The size relationships and the rows that are thereby pushed into one another guarantee reliable shielding of disruptive microwave radiation in the case of regular arrangements of the shielding surfaces, and, at the same time, the communication of the RFID chip, by way of its antenna, can take place passing through between the shielding surfaces.

To some advantage, the interstice between the shielding surfaces can lie between 0.5 mm and 5 mm in width, and it can be provided that the shielding surfaces take up between 65 and 75 percent, preferably 70 percent of the surface area of the substrate. The limited interstice between the shielding surfaces guarantees that the disruptive microwave radiation is shielded. In particular, it is advantageous if the surface area of the substrate is covered with the metallic shielding surfaces by 70 percent, and consists of 30 percent free surface area.

The shielding surfaces can be produced from copper or aluminum, preferably from aluminum having a thickness of 8 to 10 μm, and can be applied to the first substrate by means of an etching method, punching or gluing. In a further embodiment, the shielding surfaces can be imprinted using a conductive ink.

To the extent that the inlay is supposed to be cast using an in-mold method or used without protective layers, an inlay configured in such a manner can be structured to be microwave-protected based on one or more layers. The microwave-protected inlay can also be introduced into the bottom or the wall of a microwave-safe container or dish part made of plastic, glass or porcelain, with material fit, in a visible or invisible manner.

However, to the extent that the inlay is not intended to be used in its minimal state, in particular if a protective layer or an imprint is supposed to be applied, it can be provided, in concrete terms, that the first substrate that has the shielding surfaces, the applied RFID chip, and the antenna is jointly coated by a cover layer composed of imprinted or non-imprinted cast acrylate, wherein either the shielding surfaces or the RFID chip with the antenna face/faces the cover layer. The readability of the inlay easily exists in both orientations, so that it does not matter from which side the inlay is read out. Furthermore, an additional protective layer can be applied, in particular in the case of an imprinted cover layer, to protect the imprint.

Using an adhesive layer applied to the first substrate, which layer can be protected against unintentional adhesion by means of an easily removable release paper, the inlay can be affixed to an object such as a microwavable dish part, for example.

The read/write region of the microwave-safe RFID inlay can contain fixed information that is write-protected after the first programming, such as, for example, the container ID, material and manufacturer or weight, and also variable information that must continually be reprogrammed in a circulation of returnables, such as the number of returns, content and preparation information, which supports a scan-to-cook technology in the microwave devices. The information in memory can be programmed and read out by way of HF/NFC-capable smart phones or UHF readers, and sent to the microwave devices for setting the power, time, and movement patterns. Likewise, it can be provided that the microwave-safe RFID inlay on the microwave-safe container can send the required information for preparing the contents directly to a read unit installed in the microwave oven. The microwave-safe inlays can also be used in approved microwave-safe disposable packaging, and make fixed and variable information available for read-out.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

The figures show.

DETAILED DESCRIPTION OF PREFERRED EMBODIMENTS

Figure 1:
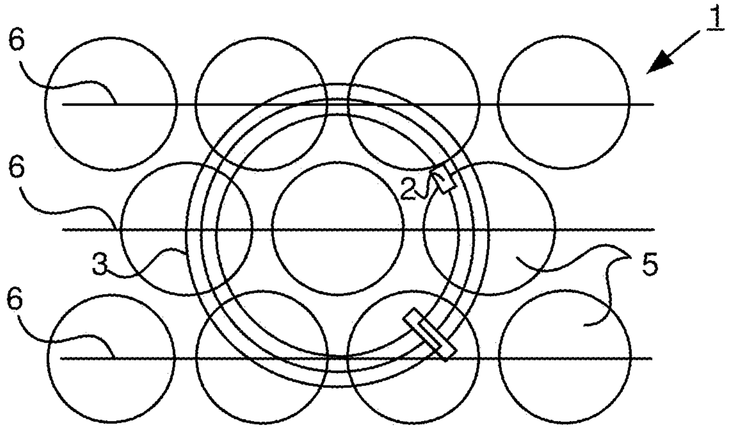
FIG. 1 an inlay according to the invention in a schematic representation, in a top view, with an RFID chip and an antenna, which inlay is applied to a first substrate having circular shielding surfaces, FIG. 2 an alternative embodiment of the inlay according to FIG. 1, with hexagonal shielding surfaces arranged in a honeycomb pattern, FIG. 3 a Smart Label in a schematic, cross-sectional representation from the side, with an embodiment of an RFID-inlay according to the invention, in which the different layers are shown, with an antenna on one side of the first substrate, FIG. 4 a Smart Label in a schematic cross-sectional representation from the side, with an RFID inlay according to the invention, in which the different layers are shown, with an antenna on both sides of a second substrate, FIG. 5 an alternative arrangement with patterns composed of shielding surfaces arranged on both sides of the first substrate, wherein the patterns are arranged offset from one another, as well as FIG. 6 a Smart Label having a structure according to FIG. 5, in a cross-sectional representation, in which the different layers are shown.

FIG. 1 shows an inlay 1 that has been set up for use on a microwavable dish. For this purpose, the inlay 1 is affixed to the microwavable dish on an underside that faces away from the observer, by way of an adhesive layer 10. The inlay 1 comprises an RFID chip 2 for communication with a reading device. This communication is brought about by the RFID chip 2 using an antenna 3. The RFID chip 2 and the antenna 3 are jointly combined with a first substrate 4, which is preferably produced from PET (polyethylene terephthalate), to produce the inlay 1 according to the invention. On the opposite side of the first substrate 4, round shielding surfaces 5 made of aluminum are arranged for shielding against the microwave radiation, which surfaces leave interstices between these shielding surfaces 5, wherein the shielding surfaces 5 are arranged in offset rows 6, at a distance from one another. The shielding surfaces 5 are thereby arranged in a pattern in which the shielding surfaces 5 within a row 6 are at a distance from one another by more than the diameter of a shielding surface 5, from center point to center point, while adjacent rows 6 are spaced apart from one another, in each instance, by less than the diameter of a shielding surface 5, so that the shielding surface 5 of every second row 6 is arranged to align with one another, in each instance. In this way, microwaves cannot penetrate through the inlay 1 with its shielding surfaces 5, along the interstices, and the shielding surfaces 5 ultimately form a metal shield for the microwave radiation. However, HF/NFC and UHF communication can nevertheless penetrate through this metal shield, so that although microwave radiation cannot damage the inlay 1, communication can take place without hindrance.

Figure 2:
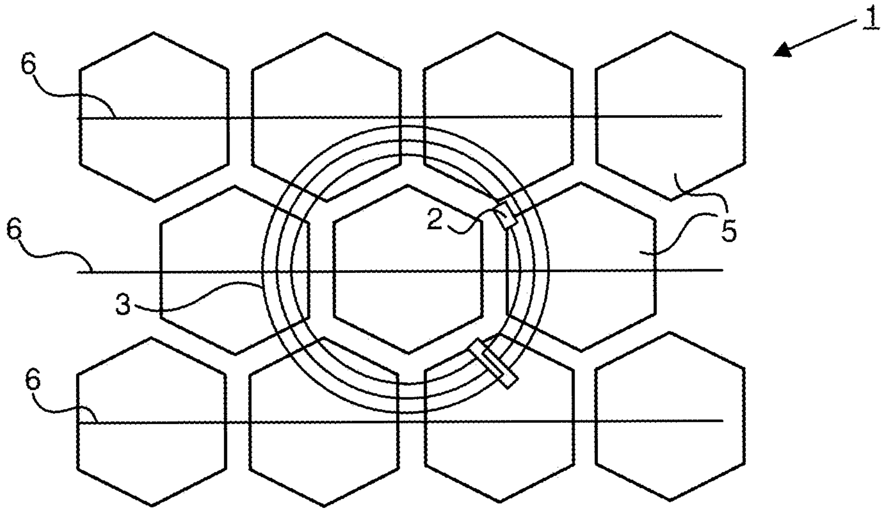

FIG. 2 shows an alternative embodiment of the inlay 1 formed by shielding surfaces 5. In this regard, the shielding surfaces 5 are configured as hexagons, so that a honeycomb pattern is formed. The hexagons form alternating rows 6 that are arranged in an alternating layer sequence. The first substrate 4 has a regular pattern of shielding surfaces 5 with interstices. The shielding surfaces 5 are arranged in such a manner that the interstices are arranged not to align in one direction. Instead, after a short path distance, for example after moving past a first shielding surface 5, an adjacent shielding surface 5 blocks further advance of a microwave beam, so that these beams constantly impact the shielding surfaces 5 arranged on the substrate 4. Coupling the energy of the microwave beam into the inlay 1, in other words into the RFID chip 2, by way of the antenna 3, can therefore be precluded.

Figure 3:
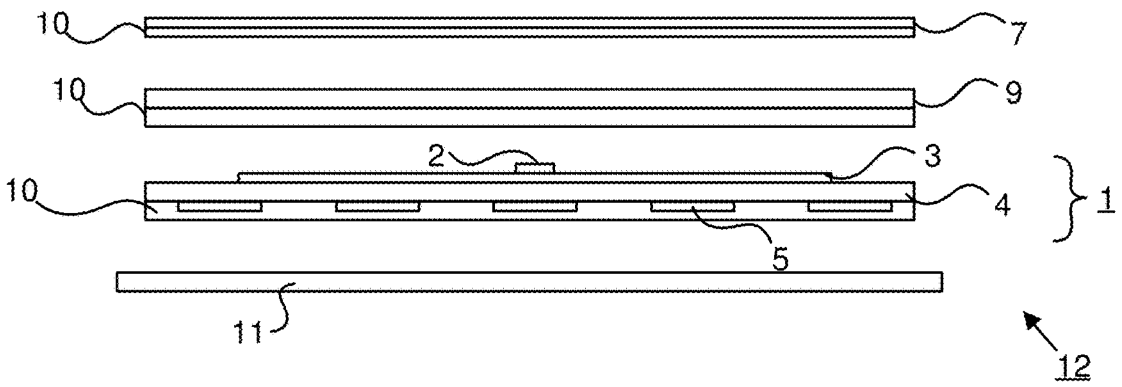

FIG. 3 shows the cross-section of a Smart Label 12, using an inlay 1 according to the invention. On a first substrate 4, shielding surfaces 5 and an RFID chip 2 having an antenna 3 are directly arranged on opposite sides, in each instance, since the antenna is affixed only on one side of the first substrate 4. The shielding surfaces 5 consist of punched-out and glued-on aluminum, or of aluminum etched out on the first substrate 4. By means of the special arrangement, a short-circuit between the metallic shielding surfaces 5 and the antenna 3 can be prevented; nevertheless, RFID communication in both directions, through the shielding, is possible, and shielding against the microwave radiation is in effect. Here, the inlay 1 is combined with a cover layer 9 and a protective film 7, to produce a Smart Label 12. Adhesive layers 10 are arranged between the layers 7 and 9 and the layers 9 and 4, and likewise under the first substrate 4, so as to be able to glue the Smart Label 12 onto a selected surface. A release paper 11 protects against accidental adhesion of the Smart Label.

Figure 4:
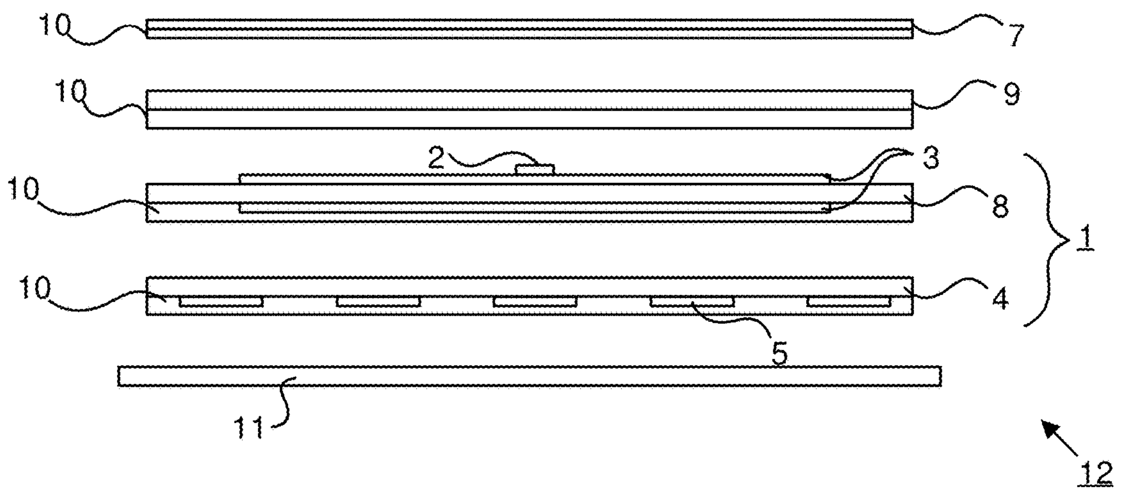

FIG. 4 shows the cross-section of a Smart Label 12 using the inlay 1 according to the invention. An antenna 3 and an RFID chip 2 are applied to a second substrate 8, wherein the antenna 3 is produced from aluminum, for example by means of etching, on both sides of the second substrate 8.

This second substrate 8 is furthermore applied, using an adhesive layer 10, to a first substrate 4 that has shielding surfaces 5 on the side that lies opposite the second substrate 8. The inlay 1 is furthermore releasably connected to a release paper 11, for example a glassine paper, by way of an adhesive layer 10. A cover layer 9, preferably composed of cast acrylate, is glued over the inlay 1. Optionally, the whole thing can be covered with a protective film 7, so as to protect an imprint applied to the cast acrylate. Adhesive layers 10 are provided between the layers 11, 4, 8, 9, and 7, in each instance, for a connection, which layers can be produced from different adhesives, depending on their use. In this way, a Smart Label 12 is formed that can transmit and receive in both directions, through the shielding, but is not susceptible to microwave radiation.

Figure 5:
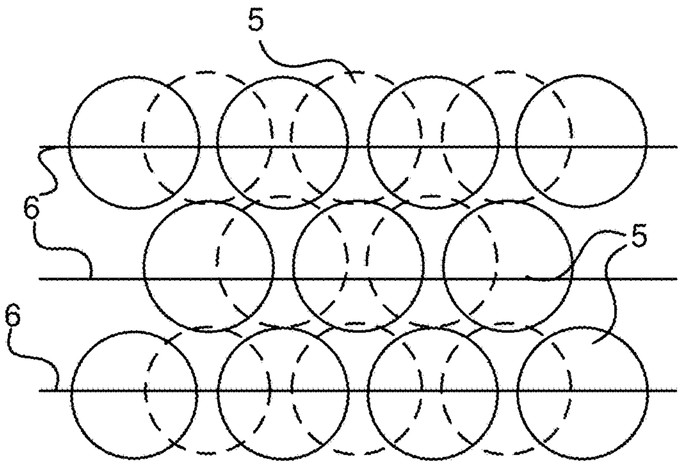

FIG. 5 shows a further variant of the shielding elements 5, which are arranged here in two pattern layers, on both sides of the first substrate 4, and, in this regard, are displaced on one side by an offset relative to the other side. In concrete terms, it can be provided that the circular shielding surfaces shown have a diameter of 5 mm, but are offset by 3 mm here, in the transverse direction shown. Other dimensions and a different offset are also possible. In this way, a surface image that is extensively closed to the microwave radiation is obtained, which image is, however, sufficient for the transmission from the antenna 3 of the RFID chip 2, due to the distances between the shielding surfaces 5 and through the first substrate 4 that lies in between.

Figure 6:
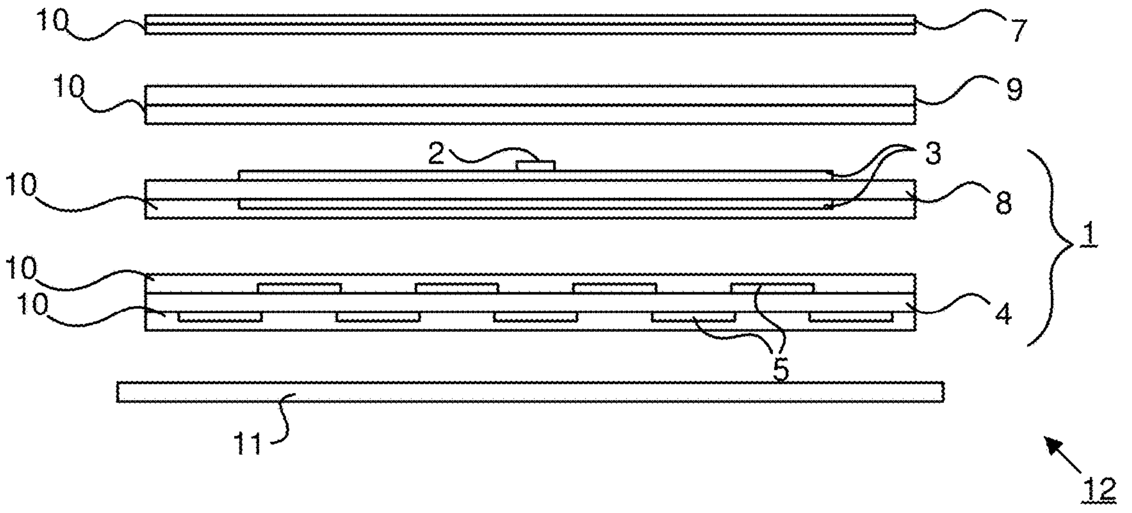

This is also evident from FIG. 6, where now layers having shielding surfaces 5 are arranged on both sides of the first substrate 4, which layers in turn are surrounded by adhesive layers 10. It is shown here how the two pattern layers are arranged to lie opposite one another on the first substrate 4; however, it is also possible to arrange the first substrate 4 on one side and a third substrate also on one side and on the side that lies opposite the second substrate 8, so as to put the shielding surfaces 5 in place. In the end result, sufficient room remains for the transmission of the antenna 3, due to the distances between the shielding surfaces 5, but the clearly longer-wave microwave beams practically necessarily impact the shielding surfaces 5, which thereby shield the antenna 3 and the RFID chip 2 that is connected to it. At least in the case of a filled microwavable dish part, the microwave radiation cannot destroy the RFID chip 2 in the case of such an inlay. In order to make sure, an additional planar shielding element can be placed below the inlay in the case of an empty dish part.

What has been described above is therefore a thin inlay that reliably shields its antenna and its RFID chip from microwaves both with and without a shielding element that has been laid underneath, and also allows bidirectional communication through the shielding, both in the HF/NFC range and in the UHF range.

Although only a few embodiments of the present invention have been shown and described, it is to be understood that many changes and modifications may be made thereunto without departing from the spirit and scope of the invention.

REFERENCE SYMBOL LIST

1 inlay
2 RFID chip
3 antenna
4 first substrate
5 shielding surface
6 row
7 protective film/foil
8 second substrate
9 cover layer
10 adhesive layer
11 release paper
12 Smart Label

The invention claimed is:

1. A microwave-safe inlay, comprising an RFID chip, an antenna connected with the chip electrically or magnetically, and a first substrate arranged surface-parallel, having a plurality of discrete shielding surfaces, wherein the RFID chip, with the antenna, is applied to the first substrate, and two adjacent shielding surfaces have an interstice between the two adjacent shielding surfaces, in each instance, wherein the shielding surfaces are arranged as separate elements, spaced apart from one another, on the first substrate, in at least one pattern layer, in which the interstices between the adjacent shielding surfaces are oriented relative to one another so as not to align, in such a manner that the adjacent shielding surfaces block every straight-line path through the shielding surfaces that runs exclusively along the interstices.

2. The inlay according to claim 1, wherein the RFID chip, together with the antenna, is applied directly to the first substrate, on a side of the first substrate that faces away from the shielding surfaces.

3. The inlay according to claim 1, wherein the RFID chip, together with the antenna, is applied to a second substrate, and the second substrate is applied to the first substrate, on a side of the first substrate that lies opposite the shielding surfaces.

4. The inlay according to claim 3, wherein the antenna is applied to the second substrate on both sides, and the shielding surfaces are applied to the first substrate on a side of the first substrate that faces away from the RFID chip and the antenna.

5. The inlay according to claim 3, wherein the second substrate is glued to the first substrate.

6. The inlay according to claim 1, wherein the RFID chip, together with the antenna, is applied to a second substrate, and the second substrate is applied to the first substrate, wherein two pattern layers are assigned, either to the first substrate on both sides or to the first substrate on one side and to a third substrate on one side, wherein the third substrate is applied to the first substrate on the side that lies opposite the second substrate.

7. The inlay according to claim 6, wherein the shielding surfaces are arranged in the pattern layers in such a manner that the pattern layers are offset from one another in at least one surface direction.

8. The inlay according to claim 7, wherein the shielding surfaces of the pattern layers overlap one another without gaps.

9. The inlay according to claim 6, wherein the second substrate is glued to the first substrate.

10. The inlay according to claim 1, wherein the shielding surfaces are configured to be circular, oval or as a regular polygon.

11. The inlay according to claim 10, wherein the shielding surfaces, along a row, take up a distance from center point to center point that is greater than the diameter of the individual shielding surfaces, while the distance of a row from an adjacent row is smaller than the diameter of the individual shielding surfaces.

12. The inlay according to claim 1, wherein the shielding surfaces comprise freely shaped contours.

13. The inlay according to claim 1, wherein the shielding surfaces, which are composed of copper or aluminum, are applied using the etching method or by being punched out and glued onto the first substrate.

14. The inlay according to claim 13, wherein the shielding surfaces are composed of 8 to 10 μm thick aluminum.

15. The inlay according to claim 1, wherein the shielding surfaces or the antenna or the shielding surfaces and the antenna are printed using a conductive ink.

16. The inlay according to claim 1, wherein an adhesive layer is assigned to the first substrate, wherein the adhesive layer is set up for being affixed to a substrate.

17. The inlay according to claim 16, wherein the substrate is a part of a microwavable dish.

18. The inlay according to claim 1, which is worked into the bottom or the wall of a microwave-safe container or dish part made of plastic, glass or porcelain, with shape fit, visibly or invisibly.

19. The inlay according to claim 1, wherein a read/write memory is assigned to the RFID chip, to which memory control commands for controlling a microwave oven are assigned.

20. The inlay according to claim 1, wherein the shielding surfaces are configured as a hexagon, so that each shielding surface is surrounded by six adjacent shielding surfaces in offset rows.

* * * * *